(12) United States Patent
Signore et al.

(10) Patent No.: US 10,655,609 B2
(45) Date of Patent: May 19, 2020

(54) SYSTEM AND METHOD FOR REMOVAL OF A WIND TURBINE GEARBOX FROM A MAIN ROTOR SHAFT

(71) Applicant: General Electric Company, Schenectady, NY (US)

(72) Inventors: Jonathan Paul Signore, Latham, NY (US); Michael R. Johnson, Campton, NH (US); Gaylon Mitchell Pfeiffer, Tampa, FL (US); Gregory Clarence Thomas, Saratoga Springs, NY (US)

(73) Assignee: General Electric Company, Schenectady, NY (US)

( * ) Notice: Subject to any disclaimer, the term of this patent is extended or adjusted under 35 U.S.C. 154(b) by 473 days.

(21) Appl. No.: 15/440,690

(22) Filed: Feb. 23, 2017

(65) Prior Publication Data
US 2018/0238308 A1    Aug. 23, 2018

(51) Int. Cl.
*F03D 80/50* (2016.01)
*F03D 15/00* (2016.01)

(52) U.S. Cl.
CPC ............ *F03D 80/50* (2016.05); *F03D 15/00* (2016.05); *F05B 2230/70* (2013.01); *F05B 2260/403* (2013.01); *Y02E 10/726* (2013.01); *Y02P 70/523* (2015.11)

(58) Field of Classification Search
CPC ....... F03D 80/50; F03D 15/00; F05B 2230/70
See application file for complete search history.

(56) References Cited

U.S. PATENT DOCUMENTS

| | | | |
|---|---|---|---|
| 7,944,079 B1 | 5/2011 | Signore et al. | |
| 8,500,400 B2 | 8/2013 | Signore et al. | |
| 9,228,567 B2 | 1/2016 | Bitsch et al. | |
| 2012/0131786 A1* | 5/2012 | Neumann | F03D 15/00 29/464 |
| 2013/0062884 A1* | 3/2013 | Bonomi | H02K 7/1838 290/55 |
| 2014/0186183 A1 | 7/2014 | Mogensen et al. | |

* cited by examiner

*Primary Examiner* — Christopher M Koehler
*Assistant Examiner* — Kyle A Cook
(74) *Attorney, Agent, or Firm* — Dority & Manning, P.A.

(57) ABSTRACT

A method and associated system are provided for removing a drive train component, such as a gearbox, from a rotor shaft uptower in a wind turbine, wherein the component is supported by transversely extending mounting arms at mount locations on the wind turbine frame. The drive train component is supported from above or below and the mount locations. At each mount location, a removal fixture is installed that includes an actuator that moves linearly essentially parallel to the rotor shaft. The mounting arms are simultaneously engaged with the respective actuators, which are controlled to linearly push the mounting arms until the drive train component disengages from the rotor shaft.

11 Claims, 6 Drawing Sheets

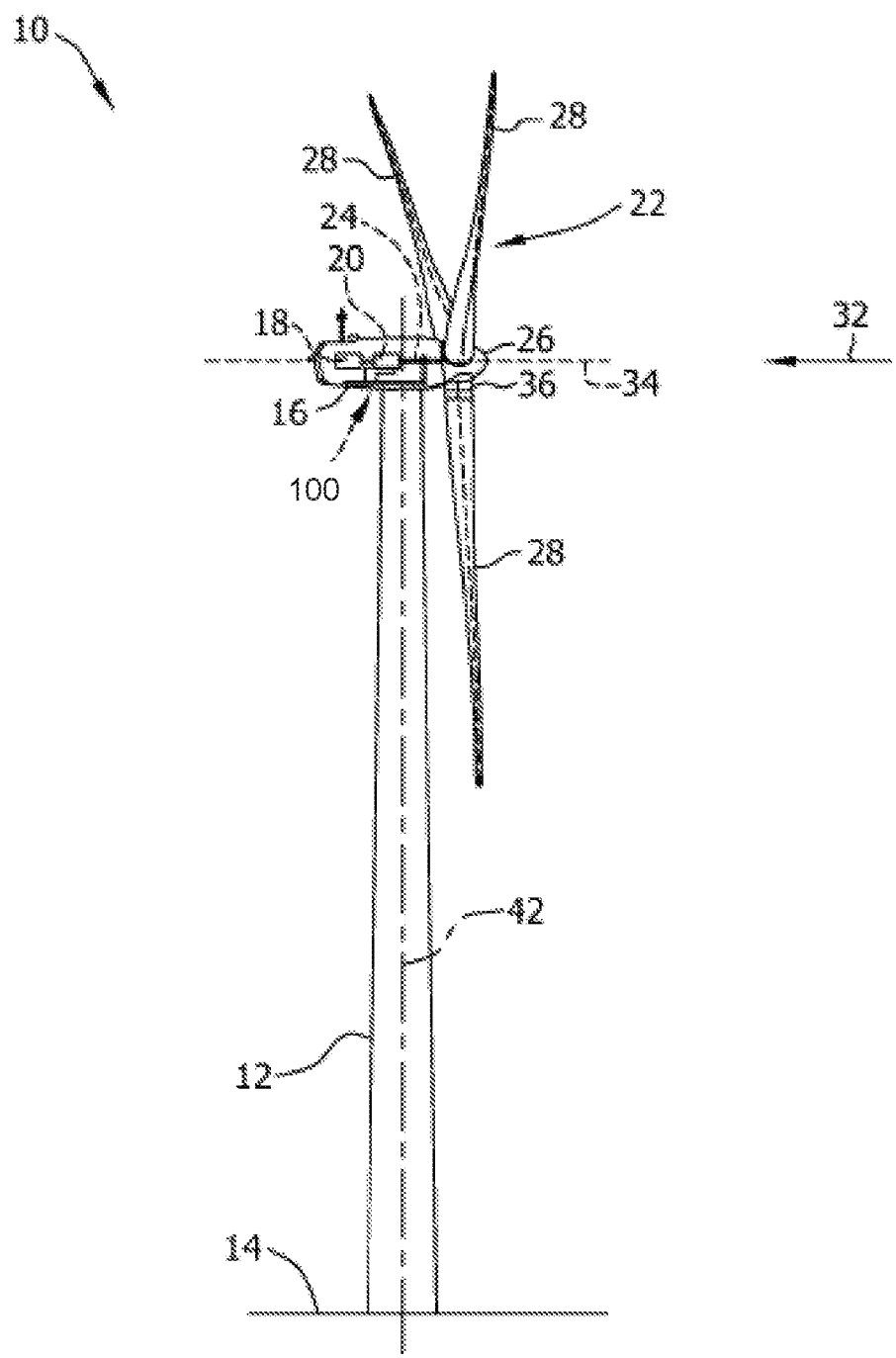
FIG. -1-

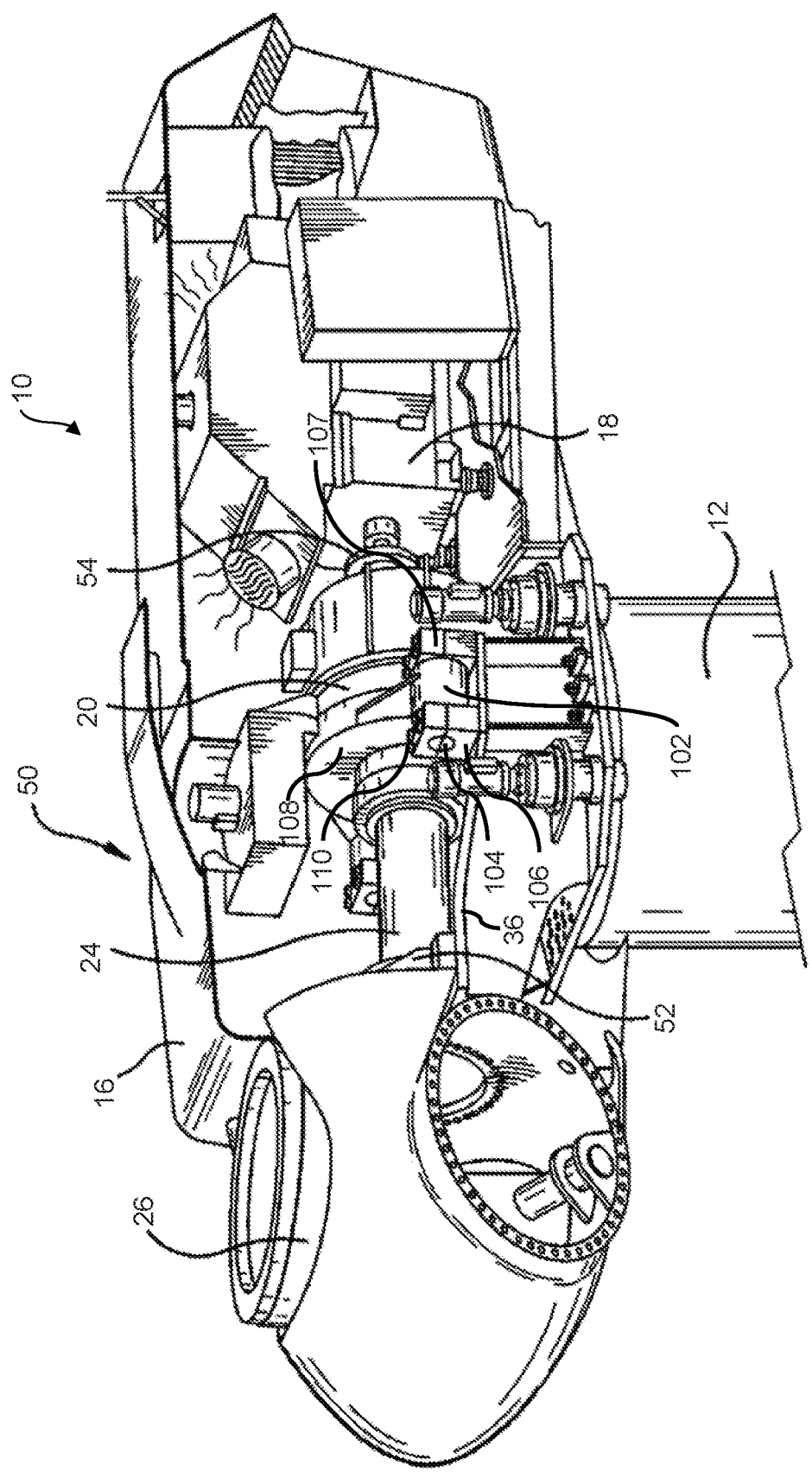
FIG. -2-

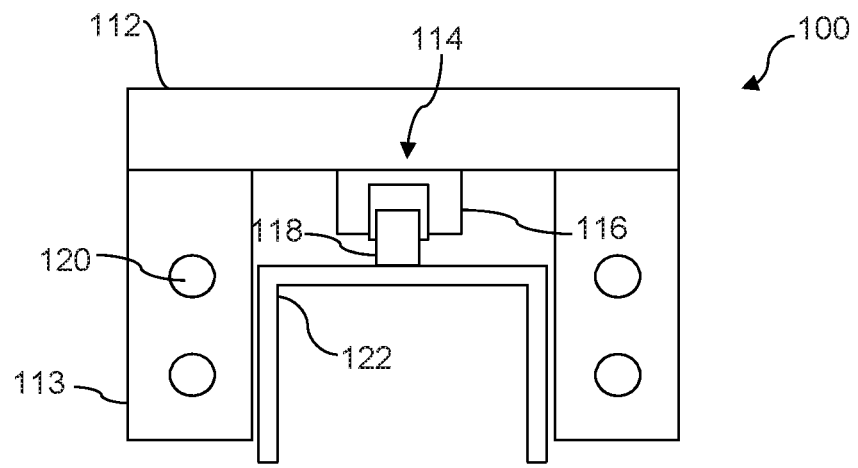
FIG. -3A-
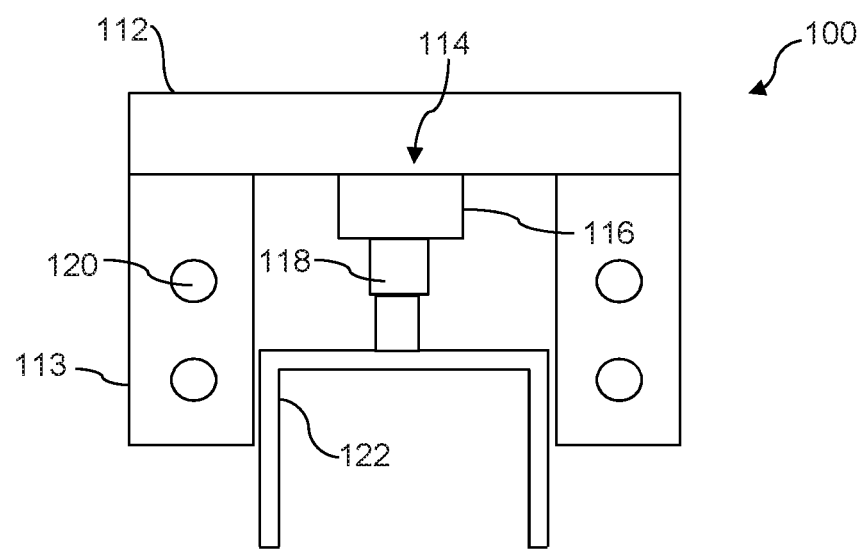
FIG. -3B-

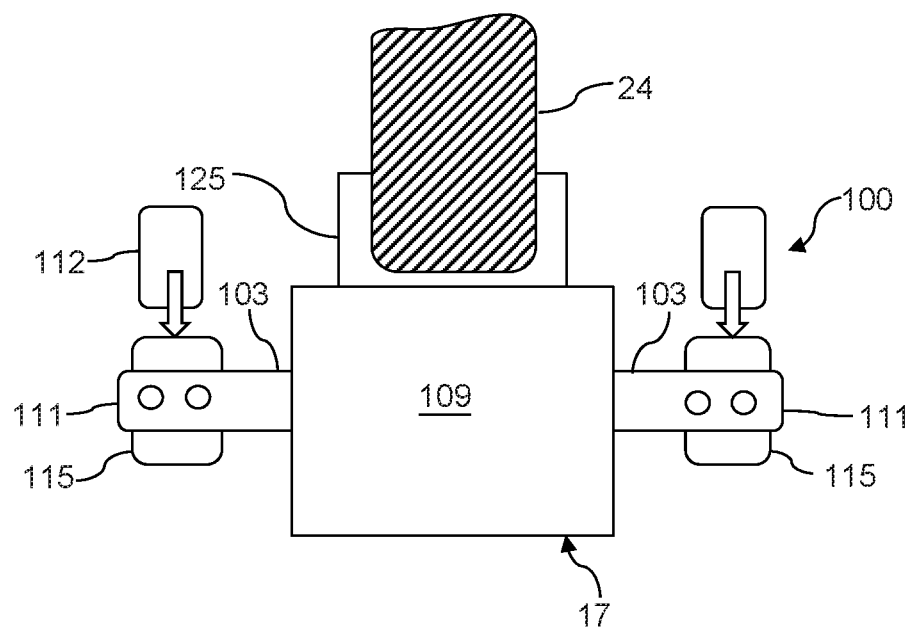
FIG. -4-
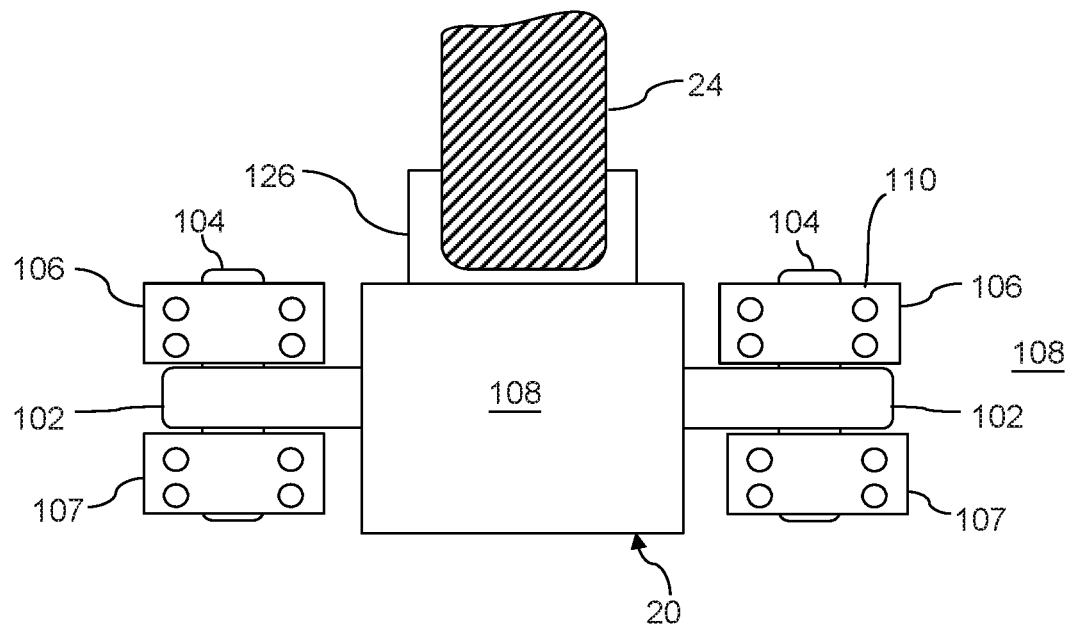
FIG. -5-

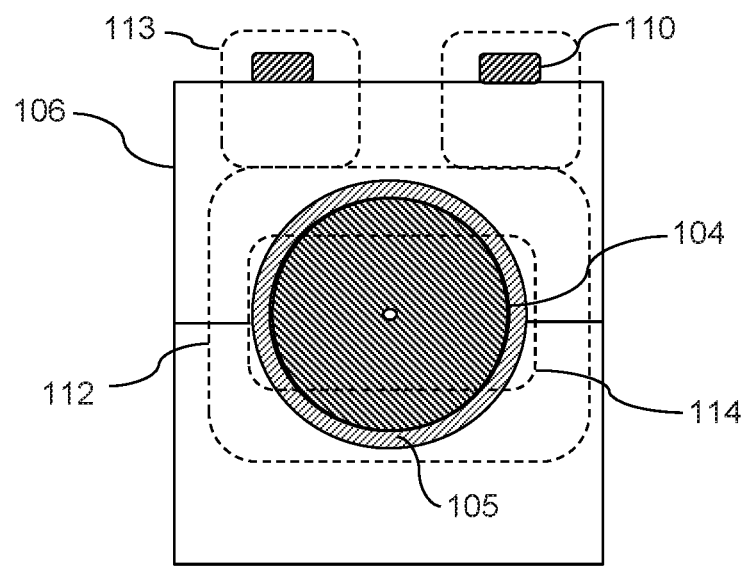
FIG. -6-
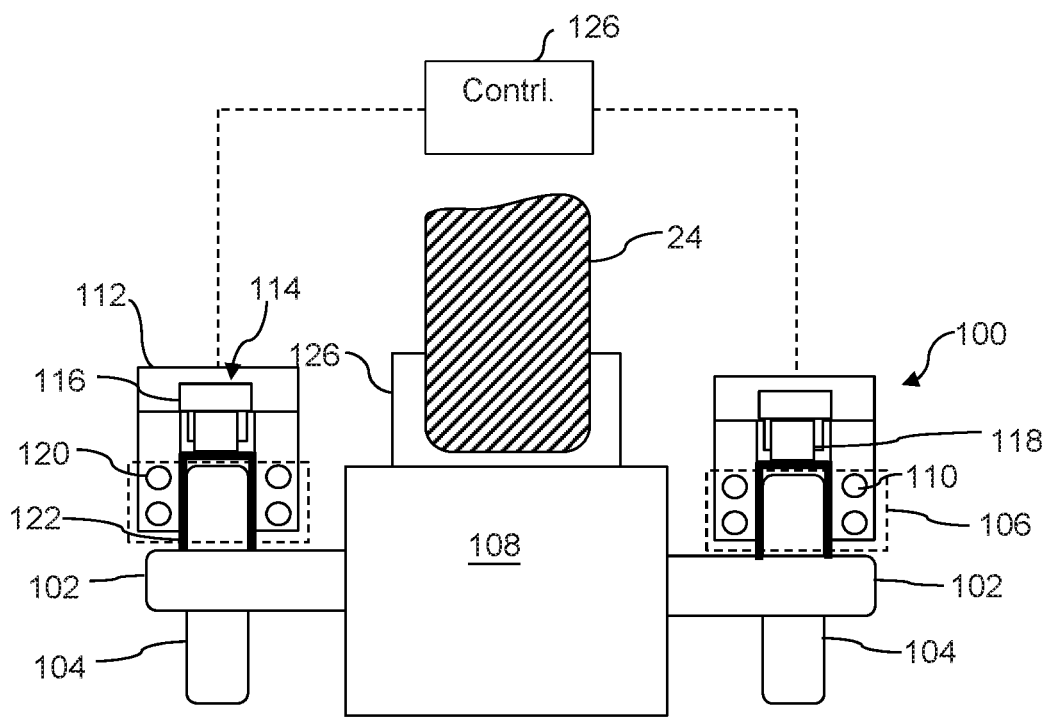
FIG. -7A-

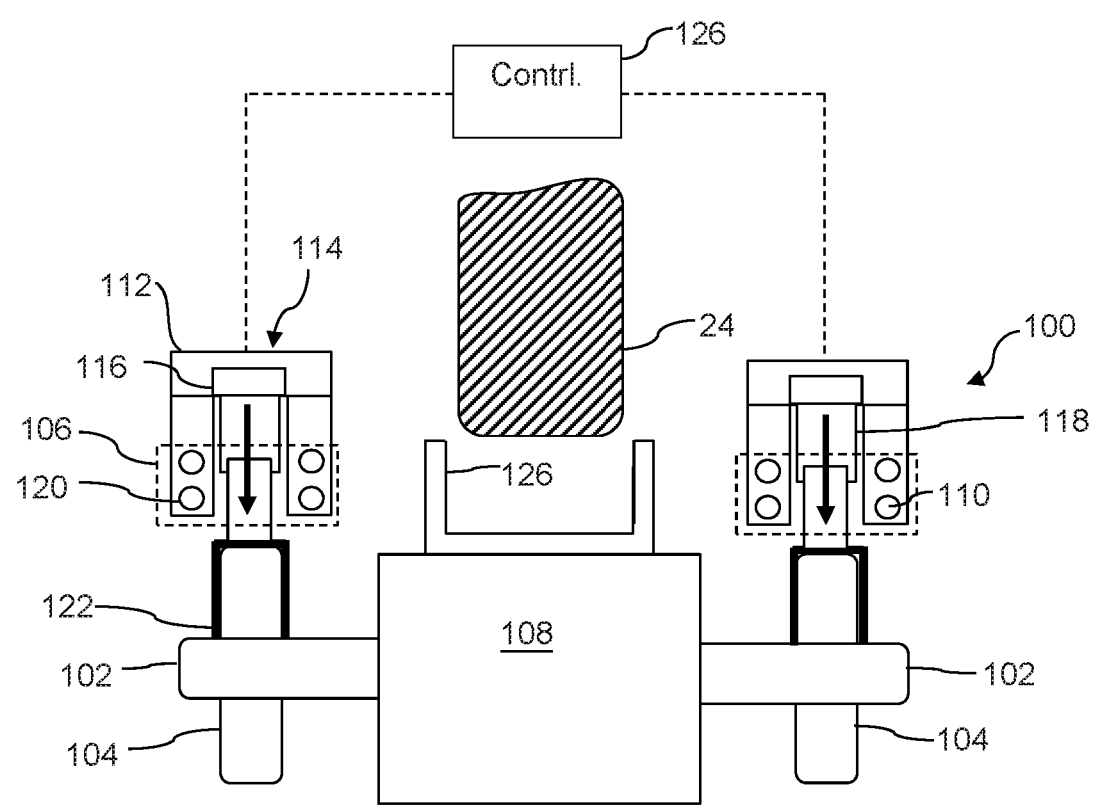
FIG. -7B-

SYSTEM AND METHOD FOR REMOVAL OF A WIND TURBINE GEARBOX FROM A MAIN ROTOR SHAFT

FIELD OF THE INVENTION

The present subject matter relates generally to systems and methods for removing the gearbox from the main shaft in a wind turbine.

BACKGROUND OF THE INVENTION

Generally, wind turbines use the wind to generate electricity. The wind turns multiple blades connected to a rotor, which spins a rotor shaft that is connected to a generator through a gearbox for producing the electricity. The gearbox is used to step up (vis a high speed shaft) the inherently low rotational speed of the turbine rotor for the generator to efficiently convert mechanical energy to electrical energy, which is provided to a utility grid. Various types of electrical generators may be used in these wind turbines.

To accommodate the need for greater power from windfarms, individual wind turbine generators are increasingly being provided with higher power output capability. In general, to accommodate a higher power output, the power generating equipment including electrical generator, gearbox and controls become larger and heavier. However, the larger components are often subjected to increased loads (e.g., asymmetric loads) that result from wind shears, yaw misalignment, and/or turbulence, and the increased loads are known to contribute to significant fatigue cycles on the drive train components, i.e., the gearbox and/or the generator. Over time, the drive train components may become worn and/or damaged, and require repair or replacement.

For example, over time, the bearings which support the high speed shaft may become worn, wherein the gearbox assembly becomes less effective in transferring rotational energy to the generator. In some cases, the bearings fail, which results in damage to the bearing bores. With certain installations, the repair of the gearbox requires the entire nacelle, gearbox, and rotor to be removed from the wind turbine prior to removing the gearbox and repairing and/or replacing the damaged gearbox. This can be a costly and expensive exercise, particularly considering that the blades can be between 60 and 100 meters in length.

Accordingly, it is desirable to provide an economical and efficient system and method for removing and/or replacing drive train components, such as a gearbox, "uptower" without removing the rotor and/or the rotor shaft from the wind turbine.

BRIEF DESCRIPTION OF THE INVENTION

Aspects and advantages of the invention will be set forth in part in the following description, or may be obvious from the description, or may be learned through practice of the invention.

In accordance with aspects of the invention, a method is provided for removing a drive train component from a rotor shaft uptower in a wind turbine, wherein the drive train component includes opposite mounting arms that extend transversely relative to the rotor shaft and mount the drive train component to a frame in the wind turbine. The method includes supporting the drive train component and disconnecting the mounting arms from the frame. At a location of each mounting arm, the method includes installing a removal fixture, each removal fixture including an actuator that moves linearly essentially parallel to the rotor shaft. The method includes simultaneously engaging the mounting arms with the respective actuators and controlling the actuators to linearly push the mounting arms until the drive train component disengages from the rotor shaft.

In certain embodiments of the method, the drive train component is a direct drive generator.

In certain other embodiments, the drive train component is gearbox, wherein the wind turbine includes a rotor coupled to the gearbox via the rotor shaft and the mounting arms are torque arms with a respective end mounted relative to the frame.

In some embodiments, each torque arm is supported by a pin carried in forward and aft mounts mounted on a frame in the wind turbine. The method includes supporting the gearbox and removing at least the aft mount at each torque arm. The gear box maybe supported, for example, from above by a sling, or from below with rails or slides. The aft mounts are removed to the extent that allows the gearbox to be displaced in the aft direction an amount sufficient to disengage the gearbox from the rotor shaft. At the location of each forward mount, a removal fixture is installed, which includes an actuator that aligns coaxial with the pin at the forward mount. The removal fixture includes any structure or configuration for supporting the actuator. The method further includes controlling the actuators to simultaneously engage the pins at the forward mounts to linearly push the pins (and thus the torque arms and generator) towards the aft mount location until the gearbox disengages from the rotor shaft.

In a particular embodiment, each fixture includes a cap configured with the actuator, wherein the method includes fitting the cap over the pin at the forward mount location. In certain embodiments, each actuator may include a hydraulic piston attached to the cap, wherein the method includes controlling each hydraulic piston so as to simultaneously push the pins and gearbox towards the aft mount location.

In one embodiment, the method may include mounting the fixtures directly onto the forward mounts without disassembling the forward mounts to any significant degree. For example, the fixtures may be mounted onto the forward mounts using existing studs that mount the forward mounts to the frame. Each fixture may include a cap configured with the actuator, wherein the method includes removing a seal from between the pin and forward mount and fitting the cap over the pin such that the cap is disposed around the pin and between the pin and the forward mount.

In other embodiments, the forward mount may be disassembled partly or wholly, wherein the fixture is installed at the mount location.

In a conventional configuration, the gearbox is attached to the rotor shaft via a coupling fixed to the gearbox, wherein the method includes controlling the actuators until the coupling disengages from the rotor shaft.

The present invention also encompasses various system embodiments for removing a drive train component from a rotor shaft uptower in a wind turbine, wherein the drive train component includes opposite mounting arms that extend transversely relative to the rotor shaft and mount the drive train component to a frame in the wind turbine. The system comprises a separate removal fixture installable at each of the mounting arm locations, wherein each removal fixture further comprises a controllable actuator configured to engage and linearly move the mounting arm relative to the shaft. The system also includes a controller configured with the actuators to coordinate and control the actuators to engage and linearly push the mounting arms until the drive train component disengages from the shaft.

In certain of the systems, the removal fixtures are configured for engaging mounting arms of a direct drive generator to separate the direct drive generator from a rotor shaft in the wind turbine.

For instances where the wind turbine includes a rotor rotatably coupled to a gearbox via the rotor shaft and the gearbox includes opposite torque arms supported by a pin carried in forward and aft mounts mounted on the frame in the wind turbine, the removal fixtures are installable at each of the forward mounts. Each of these fixtures further includes an actuator that aligns coaxial with the pin at the forward mount, wherein the actuator is linearly drivable towards the aft mount of the respective torque arm. The system includes a controller configured with the actuators to coordinate and control the actuators to engage and linearly push the pins towards the aft mounts until the gearbox disengages from the rotor shaft.

In certain system embodiments, each fixture further includes a cap configured with the actuator, wherein the cap is sized to fit over the pin at the forward mount.

The actuator may, in certain embodiments, comprise a hydraulic cylinder and piston attached to the cap. The hydraulic piston may be a telescoping piston.

In an embodiment, the fixture is configured to mount directly onto the forward mount. For example, each fixture may include a frame member that mounts atop the forward mount using the existing studs that mount the forward mount to the frame. The actuator can be attached to the frame member and disposed adjacent to a front face of the forward mount so as to be coaxial with the pin.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of an embodiment of a wind turbine according to the present disclosure;

FIG. 2 is a perspective view of a nacelle and power train configuration a wind turbine;

FIGS. 3A and 3B are diagram operational views of an embodiment of the fixture;

FIG. 4 is a diagram view of a system configured at the transversely extending mounting arms to axially separate a drive train component from the rotor shaft;

FIG. 5 is a diagram view of the torque arm mounts of a conventional generator;

FIG. 6 is a diagram view of a fixture mounted to a forward mount of a generator; and FIGS. 7A and 7B are diagram operational views of a system embodiment in accordance with aspects of the invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The system and method embodiments described herein enable removal of the gearbox from the rotor shaft without requiring the nacelle, rotor, and/or rotor shaft of the wind turbine to be removed. More specifically, the gearbox removal assembly described herein enables the gearbox to be removed and/or replaced uptower without requiring the rotor shaft and/or the rotor to be removed. As used herein, the term "uptower" is intended to be representative of any location of the wind turbine that is above a top portion of a wind turbine tower, for example, any location within or outside of the nacelle and/or rotor while the nacelle and/or rotor are coupled to the top portion of the wind turbine tower.

FIG. 1 is a perspective view of an exemplary horizontal-axis wind turbine 10. Alternatively, the wind turbine 10 may be a vertical-axis wind turbine. In the exemplary embodiment, the wind turbine 10 includes a tower 12 that extends from a support surface 14, and a nacelle 16 mounted on tower 12. A generator 18 is located in the within nacelle 16, and a gearbox 20 is mounted to a frame 36 and coupled to the generator 18. A rotor 22 is rotatably coupled to the gearbox 20 with a rotor shaft 24. The rotor 22 includes a rotatable hub 26 and at least one rotor blade 28 (FIG. 1) coupled to and extending outward from the hub 26. With this particular drive train configuration, a gearbox removal system 100 may be coupled to the gearbox 20 to facilitate pulling the gearbox 20 off of the rotor shaft 24 for subsequent removal of the gearbox 20 from nacelle 16 uptower of the wind turbine 10, as described in greater detail below.

FIG. 2 illustrates a prior art power train 50 for a wind turbine 10 within the nacelle 16 atop the tower 12. The rotor hub 26 is driven by the wind turbine blades 28 (FIG. 1) to turn the main rotor shaft 24 supported by a main bearing 52. The gearbox 20 is operatively connected to the rotor shaft 24 and steps up the relatively slow revolution speed of the rotor shaft 24 to provide an input drive to the wind turbine generator 18. The gearbox 20 is configured with the generator 18 through a coupling 54.

As mentioned above, the gearbox removal system 100 (and associated method of operation) is not limited to removal of a gearbox from the rotor shaft 24. Referring to FIG. 4, the system/method 100 are useful for separating any manner of drive train component 17 from the rotor shaft 24. The drive train component 17 may be a direct drive generator, a gearbox, or the like, couple to the shaft 24 with a conventional coupling 125. The component 17 may include a housing 109 with transversely extending (relative to an axis of the rotor shaft 24) mounting arms 103. Each mounting arm 103 may include a mounting end 111 configured to mount directly onto a frame mount or surface 115 via bolts or other suitable connectors. The system/method 100 according to the invention includes a removal fixture 112 disposed at each mounting location of the arms 103, as described in greater detail below. The system/100 includes and actuator at each removal fixture 112 that engages against the mounting arm 103 and linearly pushes the component 17 axially until the component 17 disengages from the shaft 24

The method in accordance with aspects of the invention for removing the drive train component 17 (e.g., a gearbox 20) from the rotor shaft uptower in the wind turbine 10 includes initially supporting the component 17 by any manner of device or system, such as from above by a sling, or from below with rails or slides. Various methods and devices are well-known for supporting a drive train component 17, particularly the gear box 20, for subsequent removal from the shaft 24.

In the embodiment depicted in FIG. 5, the drive train component is a gearbox 20 having a housing 108 with opposite, transversely extending torque arms 102 mounted to the frame 36 via a longitudinally disposed pin 104 that extends through the torque arm 102. The pin 104 is seated in forward pin mount 106 on one side of the torque arm 102 and an aft pin mount 107 at the opposite side of the torque arm 102. The pins 104 are rigidly fixed to the torque arms. Each of the forward mounts 106 and aft mounts 107 are fixed to the frame 36 with bolts or studs 110.

Referring to FIG. 5, the gearbox 20 is fixed to the rotor shaft 24 via a conventional gearbox coupling 126, which is depicted as a sleeve in FIG. 4.

As depicted in FIG. 7A, the aft mounts 107 are removed or disassembled to an extent that allows the gearbox 20 to be displaced in the aft direction an amount sufficient to disengage the gearbox coupling 126 from the rotor shaft 24, as depicted in FIG. 6B.

At the location of each forward mount 106, a removal fixture 112 is installed, an embodiment of which is diagrammatically depicted in FIGS. 3A and 3B. The removal fixture 112 includes any structure or configuration for supporting an actuator 114 at a location relative to the forward mount 106 to align coaxial with the pin 104. The actuator 114 encompasses any manner of system or device that engages the pin 104 and generates sufficient linear force to push the pin 104 (and associated torque arm 102 and gearbox 20) towards the aft mount. In the illustrated embodiments, the actuator 114 includes a hydraulic cylinder 116 and associated piston 118, wherein the piston 118 engages against a front face of the pin 104, or an intervening member such as a cap 122 that fits over the pin 104. The piston 118 may be a telescoping piston or ram member, as depicted in the figures.

In alternate embodiments, the actuator 114 may comprise any manner of known linear actuator, such as a roller-screw actuator, electro-mechanical actuator, pneumatic actuator, and so forth.

A controller 126 (FIGS. 7A and 7B) is in operative communication with the actuators 114 to cause simultaneous engagement and displacement of the pins 104 towards the aft mount location until the gearbox 20 disengages from the rotor shaft 24, as depicted in FIG. 7B. The controller may be in communication with one or more sensors disposed to detect position and/or movement of the gearbox 20 so that the controller 126 can control and coordinate the actuators 114 in response to signals from the sensors to prevent a torqueing or jamming of the gearbox resulting from non-uniform movement at the torque arms 102.

In the embodiment of FIGS. 3A and 3B, each fixture 112 includes a cap 122 configured with the actuator 114. The cap 122 is designed to fit over the pin 104 at the forward mount 106 and is connected to the actuator 114.

The fixtures 112 may be designed to mount directly onto the forward mounts 106 without disassembling the forward mounts to any significant degree. For example, each fixture 112 may include a frame member 113 with holes 120, wherein the frame member 113 mounts atop the forward mount 106 and the holes 120 align with the existing studs 110 that mount the forward mount 106 to the frame 36. The actuator 114 can be attached to the frame member 113 so as to extend adjacent to a front face of the forward mount 106 coaxial with the pin 104.

Referring to FIG. 6, in a conventional configuration, the pin 104 is seated in the forward mount 106 with an elastomeric seal or gasket 105 surrounding the pin 104. The method may include removing this seal 105 and placing the cap 122 over the pin 104 in the space previously occupied by the seal 105. In this manner, the pin is linearly pushed through the forward mount 106 towards the aft mount 107 location without removal or disassembly of the forward mount 106, as depicted in FIGS. 7A and 7B.

The present invention also encompasses various embodiments of a gearbox removal system 100 having the components discussed above for removing the gearbox 20 from the rotor shaft 24 uptower in the wind turbine 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for removing a drive train component from a rotor shaft uptower in a wind turbine, the drive train component including opposite mounting arms that extend transversely relative to the rotor shaft, each mounting arm including a pin that extends parallel to the rotor shaft the pins seated in mounts that are fixed to a frame in the wind turbine to mount the drive train component to the frame, the method comprising:

supporting the drive train component and disconnecting the pins from the mounts such that the pins are linearly movable relative to the mounts;

at a location of each mounting arm, installing a removal fixture, the removal fixture including an actuator that moves linearly essentially parallel to the rotor shaft; and directly engaging ends of the pins with the respective actuators and controlling the actuators to linearly push the mounting arms relative to the mounts until the drive train component disengages from the rotor shaft.

2. The method as in claim 1, wherein the drive train component is a direct drive generator.

3. The method as in claim 1, wherein each actuator comprises a hydraulic actuator.

4. The method as in claim 1, wherein the drive train component is a gearbox, the wind turbine including a rotor coupled to the gearbox via the rotor shaft, and the mounting arms are torque arms with an end mounted relative to the frame.

5. The method as in claim 4, wherein the gearbox is attached to the rotor shaft via a coupling fixed to the gearbox, the method comprising controlling the actuators until the coupling disengages from the rotor shaft.

6. The method as in claim 4, wherein each pin is seated in forward and aft mounts on the frame, the method further comprising:

removing at least the aft mount at each torque arm;
installing the removal fixture at each forward mount such that the actuator aligns with the end of the pin; and
the engaging the ends of the pins is at the forward mounts with the respective actuators to linearly push the pins towards the aft mount location until the gearbox disengages from the rotor shaft.

7. The method as in claim 6, wherein each fixture includes a cap configured with the actuator, the method comprising fitting the cap over the pin at the forward mount location.

8. The method as in claim 7, wherein each actuator includes a hydraulic piston attached to the cap, the method comprising controlling each hydraulic piston so as to simultaneously push the pins and gearbox towards the aft mount location.

9. The method as in claim 6, further comprising mounting the fixtures onto the forward mounts.

10. The method as in claim 9, wherein the fixtures are mounted onto the forward mounts using existing studs that mount the forward mounts to the frame.

11. The method as in claim 9, wherein each fixture includes a cap configured with the actuator, the method comprising removing a seal from between the pin and forward mount and fitting the cap over the pin such that the cap is disposed around the pin and between the pin and the forward mount.

* * * * *